(12) United States Patent
Berels

(10) Patent No.: US 10,434,883 B2
(45) Date of Patent: Oct. 8, 2019

(54) SAFETY CRITICAL SYSTEMS CONTROL IN AUTONOMOUS VEHICLES

(71) Applicant: Ford Global Technologies, LLC, Dearborn, MI (US)

(72) Inventor: David Jeffeory Berels, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 281 days.

(21) Appl. No.: 15/277,294

(22) Filed: Sep. 27, 2016

(65) Prior Publication Data
US 2018/0086210 A1    Mar. 29, 2018

(51) Int. Cl.
| | |
|---|---|
| B60L 11/18 | (2006.01) |
| H04L 29/08 | (2006.01) |
| H04W 4/70 | (2018.01) |
| B60W 10/18 | (2012.01) |
| B60W 10/20 | (2006.01) |
| B60W 30/10 | (2006.01) |
| G05D 1/00 | (2006.01) |
| B60L 1/00 | (2006.01) |
| B60L 1/02 | (2006.01) |
| B60L 58/20 | (2019.01) |
| H04W 4/44 | (2018.01) |

(52) U.S. Cl.
CPC ............. *B60L 11/18* (2013.01); *B60L 1/00* (2013.01); *B60L 1/02* (2013.01); *B60L 58/20* (2019.02); *B60W 10/18* (2013.01); *B60W 10/20* (2013.01); *B60W 30/10* (2013.01); *G05D 1/0088* (2013.01); *H04L 67/12* (2013.01); *H04W 4/70* (2018.02); *B60L 2210/10* (2013.01); *B60W 2710/18* (2013.01); *B60W 2710/20* (2013.01); *H04W 4/44* (2018.02); *Y02D 70/144* (2018.01); *Y02D 70/164* (2018.01)

(58) Field of Classification Search
CPC .................................. B60L 11/18; H04W 4/70
See application file for complete search history.

(56) References Cited

U.S. PATENT DOCUMENTS

| | | | |
|---|---|---|---|
| 4,665,370 | A | 5/1987 | Holland |
| 5,675,258 | A | 10/1997 | Kadouchi et al. |
| 5,998,969 | A | 12/1999 | Tsuji et al. |
| 6,417,668 | B1 | 7/2002 | Howard et al. |

(Continued)

FOREIGN PATENT DOCUMENTS

| | | |
|---|---|---|
| JP | H11176480 A | 7/1999 |
| JP | 2010145128 A | 7/2010 |

OTHER PUBLICATIONS

Search Report issued by the United Kingdom Intellectual Property Office dated Mar. 20, 2018 regarding Application No. GB1715179.6 (4 pages).

*Primary Examiner* — Rexford N Barnie
*Assistant Examiner* — Terrence R Willoughby
(74) *Attorney, Agent, or Firm* — Frank A. MacKenzie; Bejin Bieneman PLC

(57) ABSTRACT

The health and integrity of safety critical vehicle systems of a vehicle can be determined by energizing the safety critical vehicle systems with a first power source, determining a first voltage of the first power source, and then determining a second voltage of a second power source. Comparing the first and second voltages can determine the health and integrity of safety critical vehicle systems.

18 Claims, 6 Drawing Sheets

(56) References Cited

U.S. PATENT DOCUMENTS

| | | |
|---|---|---|
| 7,116,109 B2 | 10/2006 | Klang |
| 7,723,993 B2 | 5/2010 | Klang |
| 2003/0062874 A1 | 4/2003 | Furukawa |
| 2007/0182348 A1 | 8/2007 | Ooishi et al. |
| 2011/0148424 A1 | 6/2011 | Chiang et al. |
| 2011/0196632 A1 | 8/2011 | Shimizu |
| 2014/0176148 A1 | 6/2014 | Makihara et al. |
| 2014/0239965 A1 | 8/2014 | Calderon et al. |
| 2015/0097527 A1* | 4/2015 | DeDona .............. B60L 11/1818 320/109 |
| 2016/0172720 A1* | 6/2016 | Lammeren .......... H01M 10/482 429/90 |
| 2017/0080883 A1* | 3/2017 | Yasunori ................ B60R 16/02 |

\* cited by examiner

SAFETY CRITICAL SYSTEMS CONTROL IN AUTONOMOUS VEHICLES

BACKGROUND

Vehicles can be equipped to operate in both autonomous and occupant-piloted mode. While operating in autonomous mode, an array of sensors can be used to pilot the vehicle without the assistance of an occupant.

DETAILED DESCRIPTION

Vehicles can be equipped to operate in both autonomous and occupant-piloted mode. While operating in autonomous mode, an array of sensors can be used to pilot the vehicle without the assistance of an occupant. Occupants can see warning lights and messages and detect failed or unsafe operation by operation of safety critical systems such as brakes, steering or powertrain and determine that the vehicle required service or was unsafe, for example. In autonomous mode, vehicles can be equipped to determine the health and integrity of safety critical systems prior to and during operation to alert appropriate service providers to service the safety critical systems and determine if the vehicle was unsafe for operation.

Figure 1:
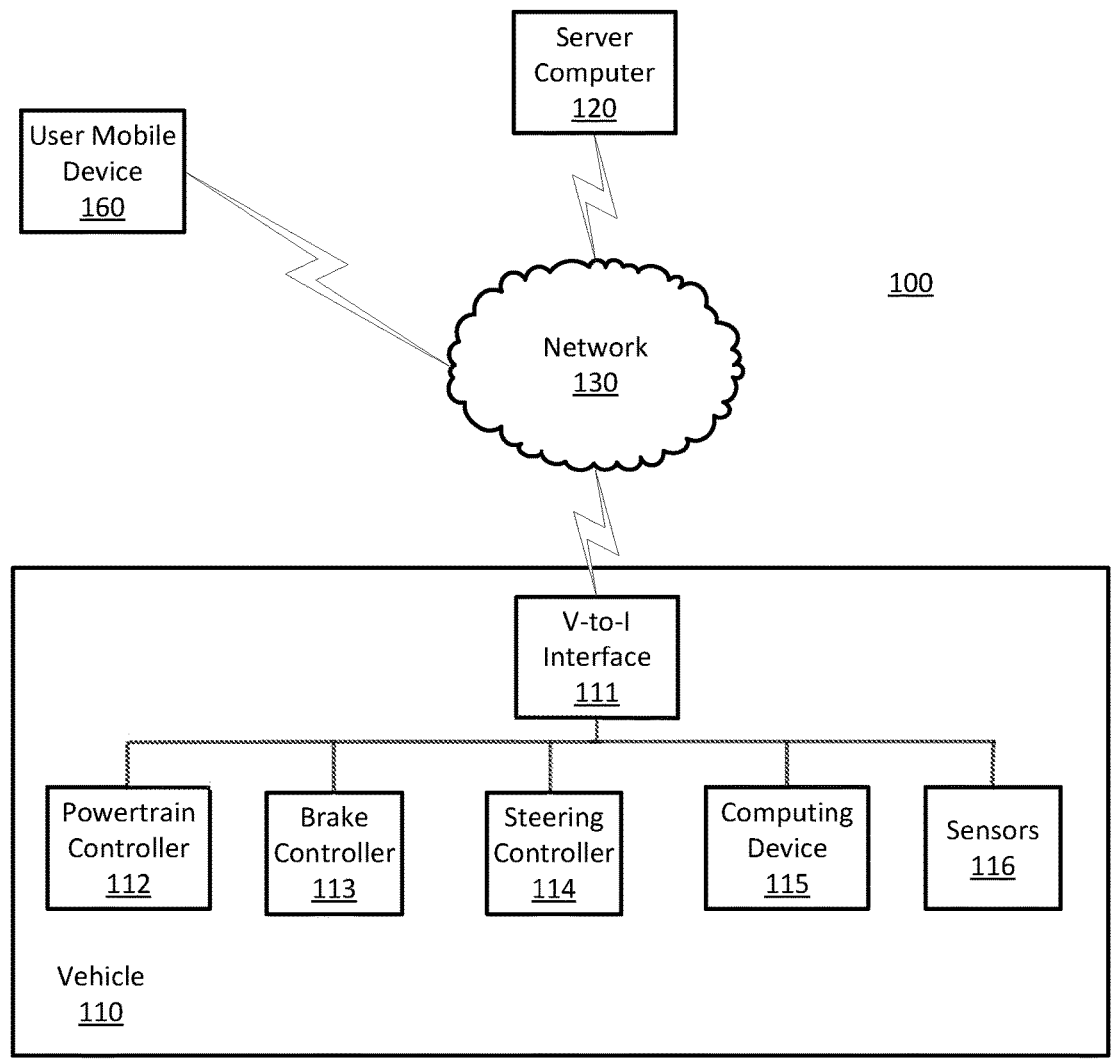
FIG. 1 is a diagram of a vehicle operable in autonomous and occupant-piloted mode according to disclosed examples.

FIG. 1 is a diagram of a vehicle information system 100 that includes a vehicle 110 operable in autonomous and occupant-piloted mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130. The V-to-I interface 111, as described below, may utilize various wired and/or wireless networking technologies, e.g., cellular, BLUETOOTH® and wired and/or wireless packet networks. The computing device 115 also includes nonvolatile memory such as are known. Computing device 115 can log information by storing the information in nonvolatile memory for later retrieval and transmittal via the vehicle communication network and V-to-I interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle system. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide a geographical coordinates of the vehicle 110. The distance provided by the radar or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or neighboring vehicles 110. The sensors 116 may further be used to collect dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Figure 2:
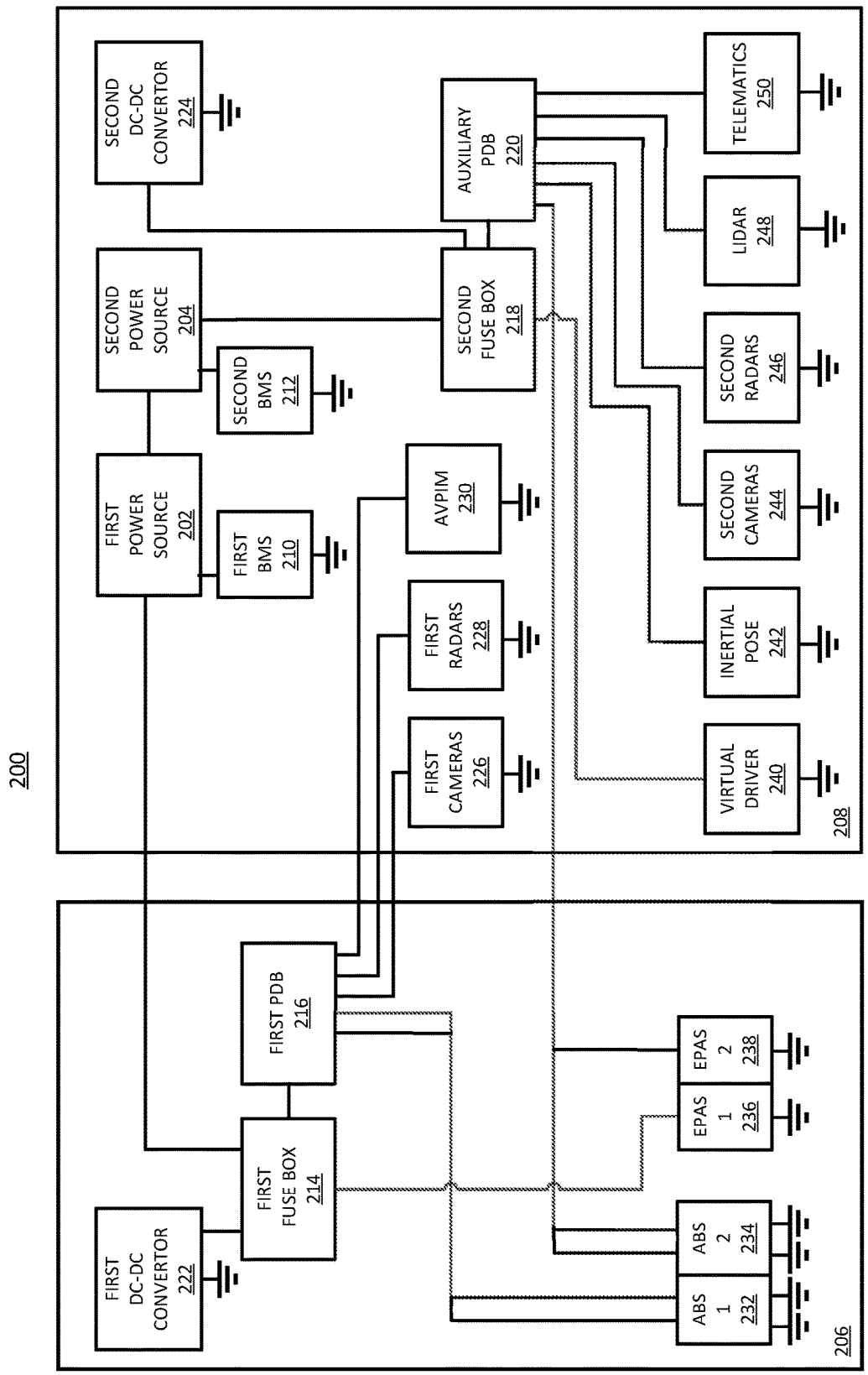
FIG. 2 is a diagram of a vehicle electrical system according to disclosed examples.

FIG. 2 is a diagram of a vehicle electrical system 200, including a first power source 202 and a second power source 204. First power source 202 and second power source 204 can be 12 volt batteries, for example. First power source 202 and second power source 204 can be included in body 208 of vehicle 110. Body 208 of vehicle 110 includes exterior surfaces and interior portions of vehicle 110, except for engine bay 206.

Body 208 may support the vehicle 110 and may be of unibody or body-on-frame construction. Body 208 includes exterior surfaces of vehicle 110 including hoods, windows, doors, lids or hatches and interior spaces of vehicle including occupant compartments, trunks and engine bay 206, for example. Exterior portions of body 208 may present a Class-A, substantially defect free, finely-finished surface appearance and can be of any functionally suitable material, such as painted steel, aluminum and plastic, etc.

Engine bay 206 is an enclosed portion of body 208 of vehicle 110 that includes safety critical systems including first and second automatic braking systems (ABS1) 232 and (ABS2) 234 and first and second electronic power-assisted steering systems (EPAS1) 236 and (EPAS2) 238. Body 208 includes safety critical systems including first and second cameras 226, 244, first and second radars 228, 246, LIDAR 248, inertial pose 242, autonomous vehicle pilot information manager (AVPIM) 230 and virtual driver 240.

First power source 202 can be controlled by first battery management system (FIRST BMS) 210 and second power source 204 can be controlled by second battery management system (SECOND BMS) 212. First and second battery management systems 210, 212 can control first and second power sources 202, 204 respectively by controlling access to ground, for example. Interrupting a current path to ground by first and second battery management systems 210, 212 can effectively take first and second power sources 202, 204 out of the circuit and prevent first and second power sources 202, 204 from energizing vehicle electrical system 200. First and second power sources 202, 204 are fused internally and strapped together at the 12-volt output to both provide 12-volt power to both first fuse box 214 and second fuse box 218.

First and second fuse boxes 214, 218 are also power by first and second DC-DC convertors 222, 224. First and second DC-DC convertors convert DC from high voltage storage batteries associated with electric drivetrain components, for example. In this manner, while vehicle 110 is producing electrical power from regenerative braking, for example, first and second DC-DC convertors 222,224 can produce 12-volt power to power vehicle electrical system via first and second fuse boxes 214, 218 and first and auxiliary power distribution busses (FIRST PDB, AUXILARY PDB) 216, 220.

First power distribution bus 216 receives 12-volt power from first fuse box 214 and provides redundant 12-volt power to first automatic braking system 232 and 12-volt power to second automatic braking system 234 via internal bussing. First power distribution bus 216 provides 12-volt power to first cameras 216, first radars 228 and autonomous vehicle pilot information manager (AVPIM) 230, located outside of engine bay 206 attached to or within body 208 of vehicle 110. First cameras 216 and first radars 228 are included in sensors 116 and first autonomous vehicle pilot information manager 230 is included in computing device 115 for piloting vehicle 110 in autonomous mode.

Second fuse box 218 provides 12-volt power to auxiliary power distribution bus 220, which in turn provides 12-volt power to virtual driver 240, inertial pose 242, second cameras 244, second radars 246, LIDAR 248 and telematics 250. Auxiliary power distribution bus 220 provides 12-volt power to second electronic power-assisted steering system 238 and redundantly to second automatic braking system 234. Since 12-volt power can be internally bussed within first and second electronic power-assisted steering systems 236, 238 and first and second automatic braking systems 232, 234, auxiliary power distribution bus 220 can redundantly provide 12-volt power to first automatic braking system 232 and first electronic power-assisted steering system 236.

Virtual driver 240 comprises programming included in computing device 115. As is known, virtual driver can receive information from sensors 116 including inertial pose 242, which can determine the location, pose, velocity and rotation of the vehicle 110 with respect to the real world, second cameras 244, which, along with first cameras 226 provide information regarding the real world environment of the vehicle 110, second radars 246, which along with first radars 228 provide information regarding the real world environment of the vehicle 110 and LIDAR 248 which can provide information regarding the real world environment of the vehicle 110.

Providing 12-volt power to first cameras 226 and second cameras 244 and first radars 228 and second radars 246 with first and auxiliary power busses 216, 220 provides redundancy to these safety critical systems. Autonomous vehicle pilot information management 230 can be included in computing device 115. Computing device 115 can be programmed e.g. according to known techniques, to integrate information from sensors 116 including first and second cameras 226, 244, first and second radars 228, 246, inertial pose 242 and LIDAR 248 to present a coherent view of the real world to permit virtual driver 240 to make piloting decisions for vehicle 110.

Telematics 250 is included in computing device 115 and communicates via V-to-I interface 111 with server computers 120 and user mobile devices 160 to transmit signals including information regarding the state of vehicle 110 and receive signals including commands to operate the vehicle 110. Telematics 250 can be combined with autonomous vehicle pilot information manager 230 and virtual driver 240 to operate the vehicle 110 remotely, for example. By remote operation we mean to cause a vehicle 110 to operate, including moving, according to commands received from a source outside of the vehicle 110.

Remote operation of vehicle 110 via telematics 250 can include hybrid remote operation where a high level command can be received by vehicle 110 such as: "Travel to the service area". Virtual driver 240 and autonomous vehicle pilot information manager 230 can then determine where the vehicle 110 is relative to the service area and travel to the service area avoiding obstacles and making sure the service area door is open before entering, for example.

First and second battery management systems 210, 212 can determine voltages for first and second power sources 202, 204 by measuring voltages of first and second power sources 202, 204. First and second battery management systems 210, 212 are operative to accurately measure the first and second voltages whether first and second power sources 202, 204 are energizing their respective first and second fuse boxes 214, 216.

Figure 3:
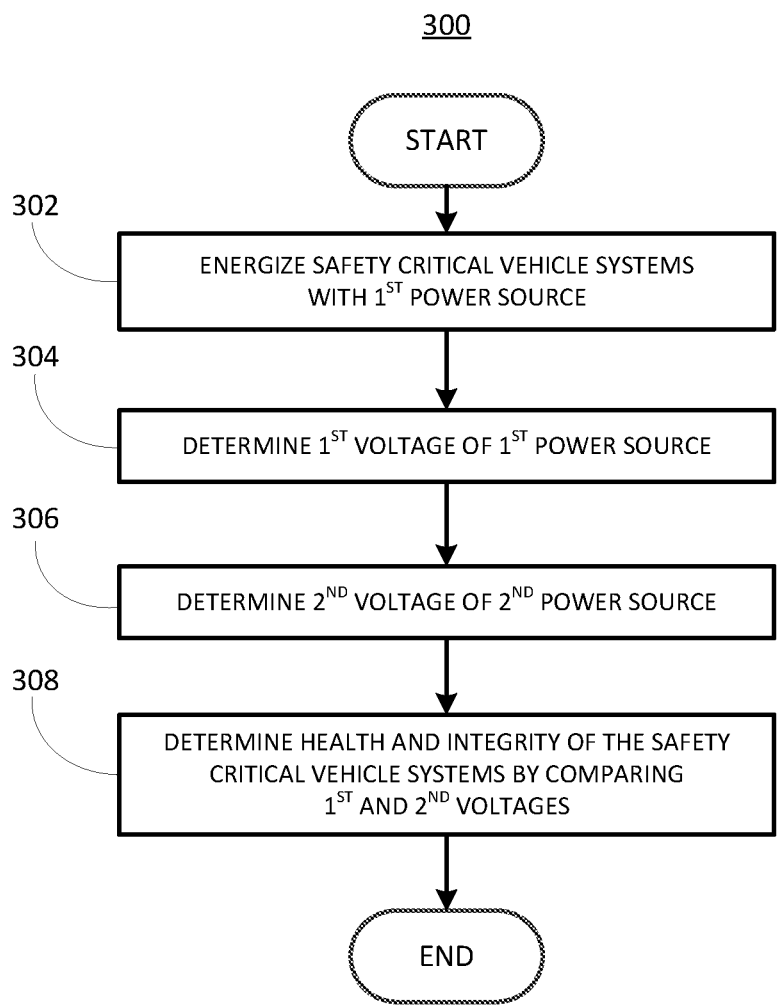
FIG. 3 is a flowchart diagram of a process to control vehicle safety critical systems according to disclosed examples.

Aspects of disclosed examples can be described with reference to FIG. 3. FIG. 3 is a flowchart diagram of a process 300 for controlling safety critical systems. Process 300 can be implemented on computing device 115, inputting information from sensors 116 and sending control signals via controllers 112, 113, 114, for example. Process 300 includes multiple steps as disclosed taken in the disclosed order. Process 300 also includes implementations including fewer steps or the steps taken in different orders.

Process 300 can be described with reference to FIG. 2, which illustrates a vehicle electrical system 200 as described above. Process 300 begins at step 302 where computing device 115 energizes first and second automatic braking systems 232, 234, first and second electronic power-assisted steering systems 236, 238, first cameras 226, first radars 228 and autonomous vehicle pilot information manager 230 with a first power source 202 and first battery management system 210.

At step 304 computing device 115 determines a first voltage of the first power source 202 with first battery management system 210 as first power source energizes vehicle electrical system 200. At step 306 computing device 115 determines a second voltage of the second power source 204. Note that second power source 204 has not been set to energize vehicle electrical system 200 by second battery management system 212.

At step 308 computing device 115 can compare the first and second voltages to determine the health and integrity of safety critical systems by comparing the first voltage to the second voltage to determine if the first power source 202 can properly provide 12-volt power to safety critical systems in vehicle electrical system 200. Determine can be defined as calculate, compute, find, recall, identify or in any manner whatsoever determine. Determining health of safety critical systems can be defined as determining that the combined current draws of all of safety critical systems are within a predetermined tolerance of a predetermined value. Determining the integrity of safety critical systems can be defined as determining that safety critical systems can be properly energized by first power source 202 in the absence of second power source 204.

The difference between first and second voltages can determine the amount of current the first power source 202 is providing to safety critical systems in vehicle electrical system 200 in the absence of second power source 204 and thereby indicate both that they are all operating within tolerance for current draw and that the first power source 202 can supply this current to all safety critical systems in vehicle electrical system 200 in the absence of second power source 204.

Determining that the sum of all current draws for safety critical systems of vehicle electrical system 200 is within a predetermined tolerance of a predetermined value confirms the health of safety critical systems of vehicle electrical system 200 by determining that all safety critical systems of vehicle electrical system 200 are likely drawing the correct amount of current, and can therefore be determined to be operating properly that the health and integrity of first power source 202 is good.

The integrity of first power source 202 can be determined by determining the sum of all current draws for safety critical systems of vehicle electrical system 200. If the sum of all current draws as evidenced by the difference between first and second voltages is within a predetermined tolerance of a predetermined value, it can be determined that the first power source 202 can energize the safety critical systems of vehicle electrical system 200 without the second power source and therefore has integrity with respect to failure of the second power source 204.

In cases where the sum of all current loads associated with safety critical systems as evidenced by the differences between first and second voltages are not within predetermined tolerance of a predetermined value, computing device 115 can log information related to this event in non-volatile memory, transmit alert signals related to this event to server computer 120, user mobile device 160 or otherwise signal via network 130 that first power source 202 is not operating within predetermined values and requires service, for example. Computing device 115 can control safety critical systems of vehicle electrical systems 200 to assure the health and integrity of first power source by directing vehicle 110 to locate and travel to a service area where a technician can clean battery posts and test voltages associated with first power source, for example.

Process 300 can be repeated while changing step 302 to energize safety critical systems of vehicle electrical system 200 with second power source 204 and second battery management system 212, while de-energizing first power source 202 with first battery management system 210. Repeating steps 304, 306 and 308 wherein the predetermined tolerances and predetermined voltages are based on first and second voltages associated with energizing safety critical systems of vehicle electrical system 200 with second power source 204.

Repeating process 300 while energizing safety critical systems of vehicle electrical system 200 with second power source 204 determines health of power source 204 by determining that the voltage difference between first and second power sources 202, 204 are within predetermined tolerance of a predetermined voltage. Integrity of second power source can be determined by determining that the voltage difference between first and second power sources 202, 204 indicates that second power source 204 is providing 12-volt power to properly energize safety critical systems of vehicle electrical system 200 to within a predetermined tolerance of a predetermined value.

In cases where the sum of all current draws as evidenced by the differences between first and second voltages are not within a predetermined tolerance of a predetermined value, computing device 115 can log information related to this event in non-volatile memory, transmit alert signals related to this event to server computer 120, user mobile device 160 or otherwise signal via network 130 that second power source 202 is not operating within predetermined values and requires service, for example. Computing device 115 can control safety critical systems of vehicle electrical systems 200 to assure the health and integrity of second power source by directing vehicle 110 to locate and travel to a service area where a technician can clean battery posts and test voltages associated with second power source, for example.

Figure 4:
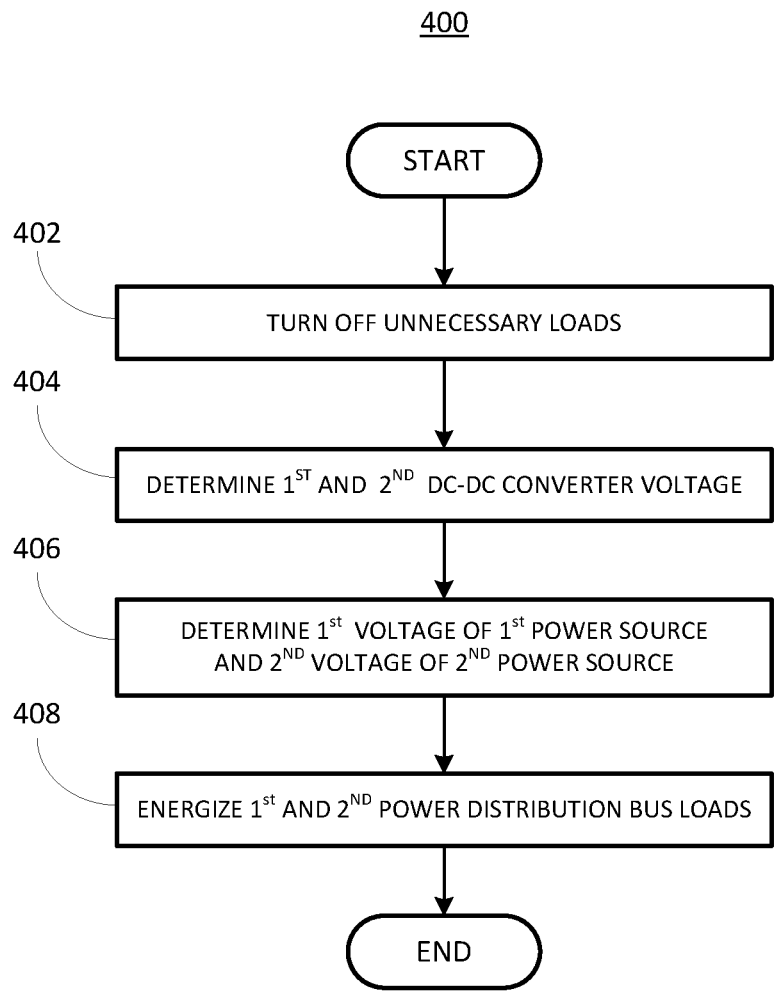
FIG. 4 is a flowchart diagram of a process to control vehicle safety critical systems according to disclosed examples.

Aspects of disclosed examples can be described with reference to FIG. 4. FIG. 4 is a flowchart diagram of a process 400 for controlling safety critical systems. Process 400 can be implemented on computing device 115, inputting information from sensors 116 and sending control signals via controllers 112, 113, 114, for example. Process 400 includes multiple steps taken in the disclosed order. Process 400 also includes implementations including fewer steps or the steps taken in different orders.

Process 400 can be performed as step 302 of process 300, for example. At step 302 of process 300, instead of energizing safety critical systems of vehicle electrical system 200 with first or second power sources 202, 204, control passes to process 400. Process 400 can be executed by computing device 115 and control then pass back to process 300, for example.

At step 402 computing device 115 turns of all unnecessary loads associated with vehicle electrical system 200. Unnecessary loads include all electrical loads included in vehicle electrical system 200 not associated with safety critical systems. Unnecessary loads can include loads associated with sensors and controllers not associated with safety critical operations such as climate control and entertainment systems, for example. This can permit more accurate measurements of currents and voltages associated with safety critical systems since currents and voltages from unnecessary loads not related to safety critical systems will not be included.

At step 404 computing device 115 determines first and second DC-DC converter voltages by measuring first DC-DC voltage at first DC-DC convertor 222 and second DC-DC voltage at second DC-DC convertor 224, Voltages can be measured by first and second battery management systems 210, 212, for example. First and second DC-DC voltages should be approximately zero in order to properly determine the health and integrity of safety critical systems, since energizing first and second DC-DC converters 222, 224 can introduce electrical loads on vehicle electrical systems in addition to safety critical systems loads. This can permit more accurate measurement of currents and voltages associated with safety critical systems since currents since voltages from first and second DC-DC converters 222, 224 will not be included.

At step 406 computing device 115 determines a first pre-test voltage of first power source 202, before first power source 202 is directed to energize vehicle electrical system 200 and a second pre-test voltage of second power source 204 before second power source 204 is directed to energize vehicle electrical system 200. These first and second pre-test voltages can be stored by computing device 115 in nonvolatile memory and recalled at step 308 of process 300 to be combined with first and second voltages, for example At step 408 computing device 115 energizes safety critical systems associated with first power distribution bus 216 including first and second automatic braking systems 232, 234, first and second electronic power-assisted steering systems 236, 238, first cameras 216, first radars 228 and autonomous vehicle pilot information manager 230 by directing first battery management system 210 to energize first power source 202 and energizes safety critical systems associated with second power distribution bus 220 by directing first and second battery management systems 210, 212 to bus the first and second power sources 202, 204 together to provide 12-volt power from first power source 202 to auxiliary power distribution bus 220 and thence to second automatic braking systems 232, 234, first and second electronic power-assisted steering systems 236, 238, virtual driver 240, inertial pose 242, second cameras 244, second radars 246, LIDAR 248 and telematics 250.

Following step 408 control can return to step 304 of process 300 to determine first and second voltages associated with first and second power sources 202, 204 and determine health and integrity of the first power source 202. As discussed above, at step 306 computing device 115 can combine first and second pre-test voltages with first and second voltages to determine health and integrity of first power source 202.

In similar fashion as described in relation to process 300, process 400 can be repeated to energize first and second power distribution loads with second power source 204 instead of first power source 202, thereby determining the health and integrity of the second power source 204 of vehicle electrical system 200 at step 306 of process 300.

Figure 5:
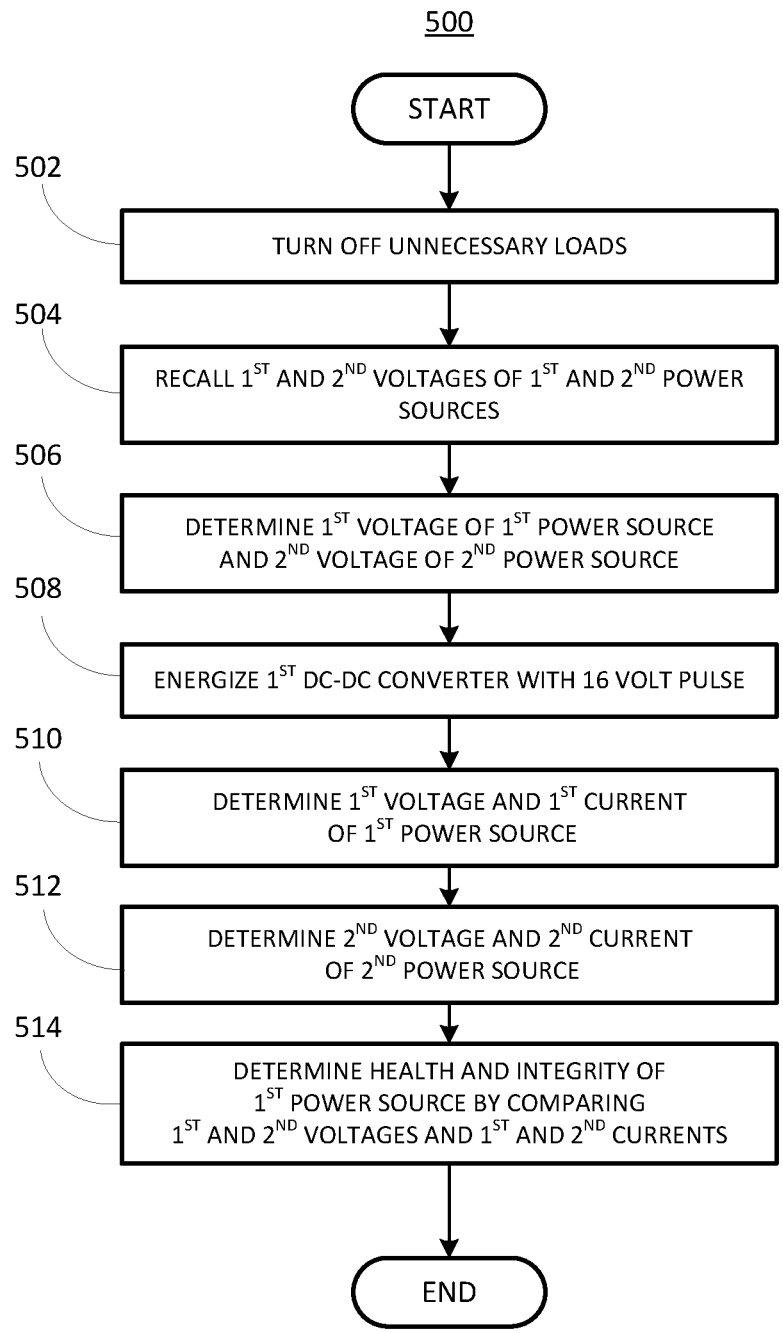
FIG. 5 is a flowchart diagram of a process to control vehicle safety critical systems according to disclosed examples.

Aspects of disclosed examples can be described with reference to FIG. 5. FIG. 5 is a flowchart diagram of a process 500 for determining the health and integrity of first power source 202. Process 500 can be implemented on computing device 115, inputting information from sensors 116 and sending control signals via controllers 112, 113, 114, for example. Process 500 includes multiple steps as disclosed taken in the disclosed order. Process 500 also includes implementations including fewer steps or the steps taken in different orders.

Process 500 is a process by which computing device 115 can determine the health and integrity of first power source 202 without energizing the safety critical systems of vehicle electrical system 200 by energizing first and second DC-DC converters 222, 224 to provide electrical loads for determining first and second voltages and currents. This permits computing device 115 to determine the health and integrity of first power source 202 separately from determining the health and integrity of the safety critical systems of vehicle electrical system 200 thereby providing more accuracy in determining the health and integrity of vehicle electrical system 200.

Accuracy in determining the health and integrity of vehicle electrical system 200 is defined as the ability to determine, based on examples disclosed herein, when the health and integrity of vehicle electrical system 200 not good, which portion of vehicle electrical system 200 is at fault. For example, computing device 115 can determine that the health and integrity of first and second power sources 202, 204 are good with process 500, which provides loads for testing first and second power sources 202, 204 using first and second DC-DC converters 222, 224. Then, when computing device 115 can determine that voltages and currents are not within predetermined tolerances of predetermined values with process 600, which provides loads for testing first and second power sources 202, 204 using loads associated with safety critical systems of vehicle electrical system 200, computing device can determine that the loads associated with safety critical systems of vehicle electrical system 200 are at fault, since first and second power sources 202, 204 have previously been determined to be in good health and integrity at process 500, for example.

Process 500 begins at step 502, where computing device 115 according to the process 500 turns off unnecessary loads as discussed above in relation to FIG. 4. In this case, since no safety critical system loads are required, all loads associated with vehicle electrical systems 200 can be turned off, including the safety critical systems of vehicle electrical system 200 and non-safety critical systems of vehicle electrical system 200. At step 504, computing device 115 can recall from nonvolatile memory first and second stored voltages. First and second stored voltages can be predetermined by computing device 115 or have been stored by computing device 115 in nonvolatile memory based on previous experience.

At step 506 a first pre-DC-test voltage is determined for first power source 202 and at step 508 a second pre-DC-test voltage is determined for second power source 204. These first and second pre-DC-test voltages can be compared by computing device 115 with first and second stored voltages. First and second pre-DC-test voltages can be compared to first and second stored voltages to determine if they are within predetermined tolerances. If they are not within predetermined tolerances, computing device 115 can log and transmit information regarding this event and take corrective action to direct vehicle 110 to a service area as described above in relation to FIG. 3.

At step 508 computing device 115 energizes first DC-DC converter 222 with a 16-volt pulse from a high-voltage storage battery associated with electric drivetrain components of vehicle 110, for example. Energizing first DC-DC converter 222 with a 16-volt pulse while energized by first power source 202 will draw a first current at a first voltage from first power source.

At step 510 computing device 115 can determine a first current and a first voltage from first power source 202, and at step 512 determine a second current and a second voltage from second power source 204. At step 514 first and second voltages can be combined with first and second pre-DC test voltages, for example, to determine the health and integrity of first power source. First and second voltages and currents and combined voltages can be compared to stored values by computing device 115. If first and second currents and voltages and combinations of first and second voltages are within predetermined tolerances of predetermined values, the first power source can be determined to have good health and integrity.

In cases where one or more of the voltages, currents, voltage differences and current differences are not within predetermined tolerances, computing device 115 can log and transmit information regarding this event and take corrective action to direct vehicle 110 to a service area as described above in relation to FIG. 3.

Repeating process 500 while energizing second DC-DC convertor 224 with a 16-volt pulse instead of first DC-DC convertor 222 at step 508 can permit computing device to determine health and integrity of second power source 204. Determining health and integrity of first and second power sources 202, 204 by energizing the DC-DC convertor can provide redundancy and accurate determination of the health and integrity of vehicle electrical system 200, since the health and integrity of first and second power sources 202, 204 can be determined independently of the health and integrity of the safety critical systems of vehicle electrical system 200.

In cases where first and second voltages and currents determined by energizing second DC-DC convertor 224 to provide electrical loads to second power source 204 are within predetermined tolerances of predetermined values, the health and integrity of second power source 204 can be determined to be good. In cases where one or more of the voltages, currents, voltage differences and current differences are not within predetermined tolerances, computing device 115 can log and transmit information regarding this event and take corrective action to direct vehicle 110 to a service area as described above in relation to FIG. 3.

Figure 6:
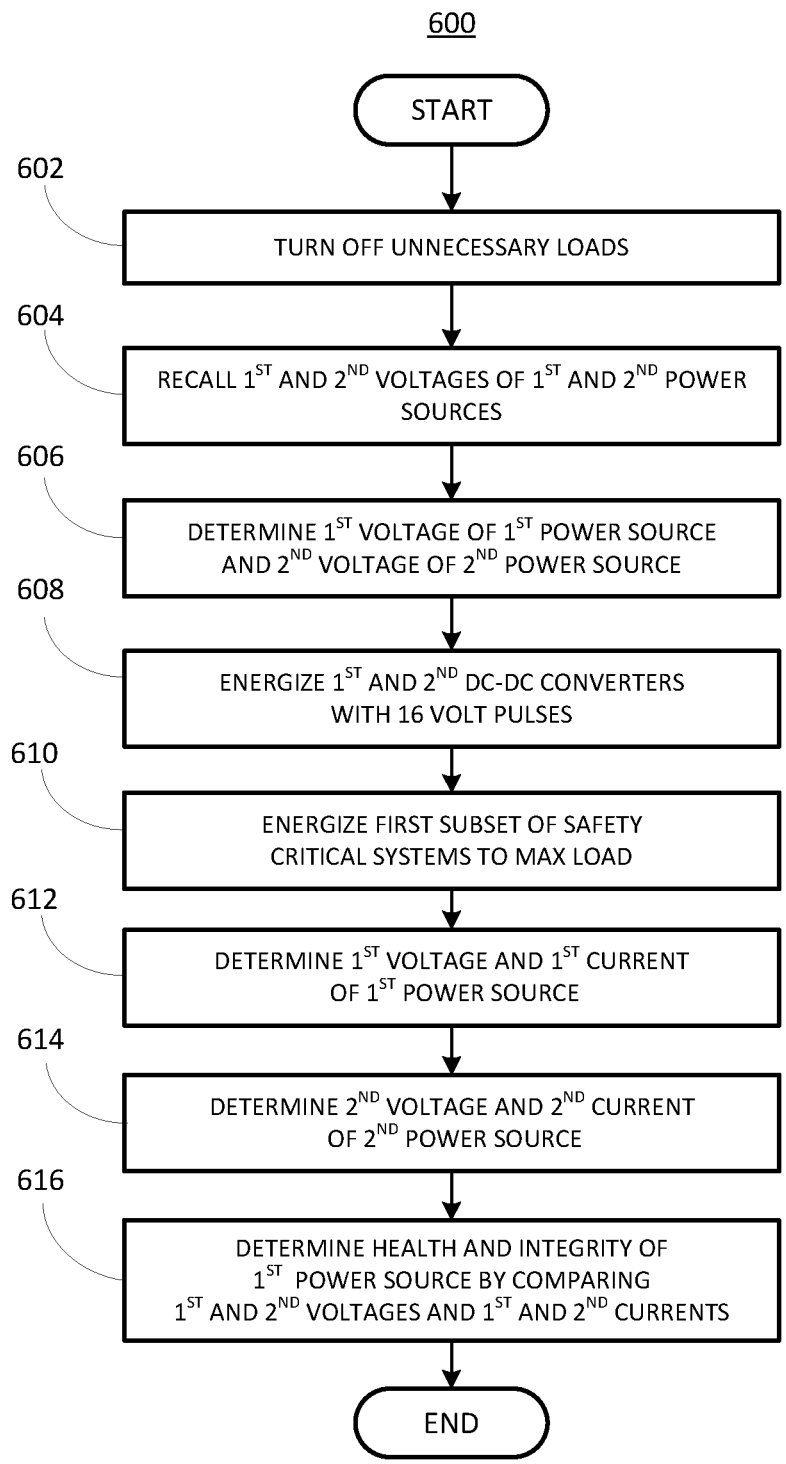
FIG. 6 is a flowchart diagram of a process to control vehicle safety critical systems according to disclosed examples.

Aspects of disclosed examples can be described with reference to FIG. 6. FIG. 6 is a flowchart diagram of a process 600 for determining the health and integrity of a first subset of safety critical systems of vehicle electrical system 200. Process 600 can be implemented on computing device 115, inputting information from sensors 116 and sending control signals via controllers 112, 113, 114, for example. Process 600 includes multiple steps taken in the disclosed order. Process 600 also includes implementations including fewer steps or the steps taken in different orders.

Process 600 is a process by which computing device 115 according to the process 600 can determine the health and integrity of first subset of safety critical systems of vehicle electrical system 200. The health and integrity of the first subset of safety critical systems of vehicle electrical system 200 can be determined since the health and integrity of first and second power sources 202, 204 can be determined independently by process 500 without energizing the safety critical systems of vehicle electrical system 200. Since first and second power sources 202, 204 have known voltage and current values stored by computing device 115 in nonvolatile memory, any deviation from predetermined values of voltage or current can be attributed to the subset of safety critical systems being energized.

Process 600 begins at step 602, where computing device 115 according to the process 600 turns off unnecessary loads as described above in relation to FIG. 4. At step 604, computing device 115 can recall from nonvolatile memory first and second stored voltages from previously executed steps, for example steps 304, 306 and 406. At step 606 a first pre-DC-test voltage is determined for first power source 202 and at step 608 a second pre-DC-test voltage is determined for second power source 204. These first and second pre-DC-test voltages can be compared by computing device 115 with first and second stored voltages recalled at step 604.

First and second pre-DC-test voltages can be compared to first and second stored voltages to determine if they are within predetermined tolerances of stored values. If they are not within predetermined tolerances, computing device 115 can log and transmit information regarding this event and take corrective action to direct vehicle 110 to a service area as described above in relation to FIG. 3.

At step 608 computing device 115 energizes first and second DC-DC converters 222, 224 with 16-volt pulses from a high-voltage storage battery associated with electric drivetrain components of vehicle 110, for example. Energizing first and second DC-DC converters 222, 224 with 16-volt pulses will supply and electrical load to first and second power sources 202, 204.

While computing device 115 energizes the first DC-DC converter 222 with a 16-volt pulse, at step 610 computing device 115 can energize a first subset of safety critical systems by directing safety critical systems associated with first fuse block 214 to operate at maximum current load and directing safety critical systems associated with second fuse block 218 to turn off.

Safety critical systems associated with first fuse block include first automatic braking system 232, first electronic power-assisted steering system 236, first cameras 226, first radars 228, autonomous vehicle piloting information manager 230, and, through cross-bussing, second automatic braking system 234 and second electronic power-assisted steering system 238, for example. Safety critical systems associated with second fuse block include second automatic braking system, second electronic power-assisted steering system 238, virtual driver 240, inertial pose 242, second cameras 244, second radars 246, LIDAR 248, telematics 250 and, through cross-bussing, first automatic braking system 232 and first electronic power-assisted steering system 236, for example.

At step 612 computing device 115 can determine a first current and a first voltage from first power source 202, and at step 614 determine a second current and a second voltage from second power source 204. At step 616 first and second voltages and currents can also be compared to first and second voltages recalled at step 504 and determined at step 506. If voltages, currents and voltage differences and are all within predetermined tolerances of expected values, computing device 115 can determine that the health and integrity of the first power source 202 are good.

In cases where the voltages, currents, voltage differences and current differences are not within predetermined tolerances, computing device 115 can log and transmit information regarding this event and take corrective action to direct vehicle 110 to a service area as described above in relation to FIG. 3.

Repeating process 600 while energizing the second subset of safety critical systems with a 16-volt pulse instead of first subset of safety critical systems at step 610 can permit computing device to determine health and integrity of second subset of safety critical systems. Determining health and integrity of first and second subsets of safety critical systems by energizing the first and second subsets of safety critical systems at maximum load one at a time can provide an accurate determination of the health and integrity of safety critical systems system 200, including cross-bussed power on first and second automatic braking systems 232, 232 and first and second electronic power-assisted steering systems 236, 238.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

I claim:

1. A method, comprising:
energizing one or more vehicle electrical systems with a first power source of two or more power sources, each power source capable of independently energizing one or more of the vehicle electrical, wherein the one or more vehicle electrical systems comprises at least one of a vehicle brake system, a vehicle steering system, or a vehicle powertrain system;
determining a voltage of the first power source while the first power source is energizing one or more of the vehicle electrical systems;
determining a voltage of a second power source of the two or more power sources while the first power source is energizing one or more of the vehicle electrical systems; and
determining that a combined voltage of the first power source while the first power source is energizing one or more of the vehicle electrical systems and voltage of the second power source while the first power source is energizing one or more of the vehicle electrical systems is within a first predetermined tolerance of a first predetermined voltage.

2. The method of claim 1 further comprising:
de-energizing the first power source;
energizing one or more of the vehicle electrical systems with the second power source;
determining a voltage of the first power source while the first power source is de-energized and while the second power source is energizing one or more of the vehicle electrical systems;
determining a voltage of the second power source while the first power source is de-energized and while the second power source is energizing one or more of the vehicle electrical systems; and
determining that a combined voltage of the first power source while the first power source is de-energized and while the second power source is energizing one or more of the vehicle electrical systems and voltage of the second power source while the first power source is de-energized and while the second power source is energizing one or more of the vehicle electrical systems is within a second predetermined tolerance of a second predetermined voltage.

3. The method of claim 1 further comprising determining that the vehicle electrical systems are energized to within the first predetermined tolerance of the first predetermined voltage under one or more fault conditions including failure of the second power source.

4. The method of claim 1 wherein the vehicle electrical systems are safety critical vehicle electrical systems.

5. The method of claim 1 further comprising energizing one or more of the vehicle electrical systems to within the first predetermined tolerance of the first predetermined voltage with the first power source alone.

6. The method of claim 1 wherein a portion of loads associated with one or more of the vehicle electrical systems are turned off before energizing the vehicle electrical systems.

7. The method of claim 1 wherein energizing the vehicle electrical systems includes energizing one or more DC-DC converters.

8. An apparatus, comprising:
a processor; and
a memory, the memory including instructions to be executed by the processor to:
energize one or more vehicle electrical systems with a first power source of two or more power sources, each power source capable of independently energizing the one or more vehicle electrical system;
determine a voltage of the first power source while the first power source is energizing one or more of the vehicle electrical systems;
determine a voltage of a second power source of the two or more power sources while the first power source is energizing one or more of the vehicle electrical systems; and
determine that a difference between the voltage of the first power source while the first power source is energizing one or more of the vehicle electrical systems and the voltage of the second power source while the first power source is energizing one or more of the vehicle electrical systems are within a first predetermined tolerance of a first predetermined voltage.

9. The apparatus of claim 8 wherein the memory includes instructions to:
de-energize the first power source;
energize one or more of the vehicle electrical systems with the second power source;
determine a voltage of the first power source while the first power source is de-energized and while the second power source is energizing one or more of the vehicle electrical systems;
determine a voltage of the second power source while the first power source is de-energized and while the second power source is energizing one or more of the vehicle electrical systems; and
determine that a difference between the voltage of the first power source while the first power source is de-energized and while the second power source is energizing one or more of the vehicle electrical systems and the voltage of the second power source while the first power source is de-energized and while the second power source is energizing one or more of the vehicle electrical systems are within a second predetermined tolerance of a second predetermined voltage.

10. The apparatus of claim 8 wherein the memory includes instructions to determine that one or more of the vehicle electrical systems are energized to within the first predetermined tolerance of the first predetermined voltage under one or more fault conditions including failure of the second power source.

11. The apparatus of claim 10 wherein the vehicle electrical systems are safety critical vehicle electrical systems.

12. The apparatus of claim 8 wherein the memory includes instructions to energize one or more of the vehicle electrical systems to within the first predetermined tolerance of the first predetermined voltage with the first power source alone.

13. The apparatus of claim 8 wherein the memory includes instructions to turn off a portion of loads associated with one or more of the vehicle electrical systems before energizing the vehicle electrical systems.

14. The apparatus of claim 8 wherein the memory includes instructions to energize one or more DC-DC converters as the vehicle electrical systems.

15. A vehicle, comprising:
a computing device including a processor; and
a memory, the memory including instructions to be executed by the processor to:
energize one or more vehicle electrical systems with a first power source of two or more power sources, each power source capable of independently energizing the one or more vehicle electrical system;

determine a voltage of the first power source while the first power source is energizing one or more of the vehicle electrical systems;

determine a voltage of a second power source of the two or more power sources while the first power source is energizing one or more of the vehicle electrical systems; and determine that a combined voltage of the first power source while the first power source is energizing one or more of the vehicle electrical systems and voltage of the second power source while the first power source is energizing one or more of the vehicle electrical systems is within a first predetermined tolerance of a first predetermined voltage.

16. The vehicle of claim 15 wherein the memory includes instructions to:

de-energize the first power source;

energize one or more of the vehicle electrical systems with the second power source;

determine a voltage of the first power source while the first power source is de-energized and while the second power source is energizing one or more of the vehicle electrical systems;

determine a voltage of the second power source while the first power source is de-energized and while the second power source is energizing one or more of the vehicle electrical systems; and determine that a difference between the voltage of the first power source while the first power source is de-energized and while the second power source is energizing one or more of the vehicle electrical systems and the voltage of the second power source while the first power source is de-energized and while the second power source is energizing one or more of the vehicle electrical systems are within a second predetermined tolerance of a second predetermined voltage.

17. The vehicle of claim 16 wherein the memory includes instructions to determine that one or more of the vehicle electrical systems are energized to within the first predetermined tolerance of the first predetermined voltage under one or more fault conditions including failure of the second power source.

18. The vehicle of claim 15 wherein the vehicle electrical systems are safety critical vehicle electrical systems.

* * * * *